United States Patent
Kohler et al.

(10) Patent No.: US 6,975,935 B2
(45) Date of Patent: Dec. 13, 2005

(54) METHOD AND DEVICE FOR MONITORING THE DIRECTION OF ROTATION OF A PISTON ENGINE

(75) Inventors: Rolf Kohler, Schwieberdingen (DE); Matthias Kottmann, Wedlingen (DE); Matthias Bauer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/512,595

(22) PCT Filed: Oct. 10, 2003

(86) PCT No.: PCT/DE03/03414

§ 371 (c)(1),
(2), (4) Date: Oct. 25, 2004

(87) PCT Pub. No.: WO2004/036017

PCT Pub. Date: Apr. 29, 2004

(65) Prior Publication Data

US 2005/0240337 A1    Oct. 27, 2005

(30) Foreign Application Priority Data

Oct. 10, 2002  (DE) .................................. 102 47 316

(51) Int. Cl.[7] ............................................. F02D 41/22

(52) U.S. Cl. ..................................................... 701/114

(58) Field of Search .................. 701/114, 115, 102; 73/116, 117.3; 123/342

(56) References Cited

U.S. PATENT DOCUMENTS

| | | | | |
|---|---|---|---|---|
| 4,592,309 A | * | 6/1986 | Williams | 123/89 |
| 4,683,852 A | * | 8/1987 | Kypreos-Pantazis | 123/230 |
| 4,834,044 A | * | 5/1989 | Maas | 123/342 |

FOREIGN PATENT DOCUMENTS

| | | |
|---|---|---|
| DE | 197 22 016 | 12/1998 |
| DE | 199 33 845 | 1/2001 |
| JP | 61 023847 | 2/1986 |
| WO | 90 03508 | 4/1990 |

OTHER PUBLICATIONS

Patent Abstract of Japan vol. 010 No. 174 (M-490) Jun. 19, 1986 (Feb. 01, 1986)*.

* cited by examiner

Primary Examiner—Hieu T. Vo
(74) Attorney, Agent, or Firm—Kenyon & Kenyon

(57) ABSTRACT

A method and device for detecting the rotation direction of a piston engine, internal combustion engine or piston compressor. The piston engine includes at least one cylinder, a piston movable back and forth in the cylinder, a cylinder chamber formed inside the cylinder which is delimited by an inner cylinder wall and the piston, an inlet channel opening into the cylinder chamber via at least one inlet valve, an outlet channel opening into the cylinder chamber via at least one outlet valve, and at least one triggerable throttling device situated in the inlet channel. To detect the rotation direction in a reliable, timely, and simple manner, the pressure prevailing in the inlet channel is measured when a rotary motion is detected, compared with a predefinable threshold value, and the rotation direction is determined based on the comparison result, the throttling device being closed at least for the pressure measurement time.

13 Claims, 3 Drawing Sheets

METHOD AND DEVICE FOR MONITORING THE DIRECTION OF ROTATION OF A PISTON ENGINE

FIELD OF THE INVENTION

The present invention relates to a method for detecting the direction of rotation of a piston engine, in particular of an internal combustion engine or of a piston compressor. The present invention also relates to a device for detecting the direction of rotation of a piston engine. Furthermore, the present invention relates to a control unit for controlling and/or regulating a piston engine. The present invention finally also relates to a computer program which is able to run on a computer, in particular on a microprocessor.

BACKGROUND INFORMATION

To ensure safe operation of a piston engine, it must be made sure that the piston engine rotates in a predefined direction. A wrong direction of rotation may be triggered in the case of an internal combustion engine, for example, by an erroneous ignition angle output and injection output of a control unit of the engine at start or by a wrong direction of rotation during start as may occur, for example, when the clutch is engaged while the vehicle is rolling backward with a forward gear engaged.

A wrong direction of rotation may result, in the case of an internal combustion engine, for example, in a subsequent start attempt remaining fruitless for some time due to the excessively rich fuel-air mixture. Furthermore, in the event of a wrong direction of rotation there is the risk of damage or destruction of devices in the inlet channel such as, for example, the intake manifold, the throttling device, or a flowmeter. Should the internal combustion engine rotate in the wrong direction, uncontrolled combustion could occur in a cylinder chamber. The inlet valve of the cylinder chamber would be open after the combustion and the hot exhaust gases would enter the inlet channel via the open inlet valve. The devices in the inlet channel could become damaged or destroyed due to a return stroke caused by the uncontrolled combustion in the cylinder and by the high exhaust gas temperatures.

A control unit for detecting the direction of rotation of an internal combustion engine of the above-mentioned type is discussed, for example, in German patent document no. 199 33 845, where the rotation of a camshaft of the internal combustion engine is detected by an absolute phase angle sensor, such as is discussed, for example, in German patent document no. 197 22 016. It is then determined, by querying the absolute phase angle, whether the signal is monotonously increasing or monotonously decreasing. The direction of rotation is determined from this information by a control unit.

In the past, reliable absolute phase angle sensors using the magnetoresistive effect and the Hall effect have been relatively complex components that included at least one control unit and a plurality of sensors.

SUMMARY OF THE INVENTION

An object of the exemplary embodiment and/or exemplary method of the present invention is to detect the direction of rotation of a piston engine in a reliable, timely, and simple manner.

The exemplary embodiment and/or exemplary method of the present invention relates to a method for detecting the direction 6f rotation of a piston engine, in particular of an internal combustion engine or of a piston compressor. The piston engine includes at least one cylinder; a piston movable back and forth in the cylinder; a cylinder chamber formed inside the cylinder, which is delimited by an inner cylinder wall and the piston; an inlet channel, which opens into the cylinder chamber via at least one inlet valve; an outlet channel, which opens into the cylinder chamber via at least one outlet valve; and at least one triggerable throttling device situated in the inlet channel.

The exemplary embodiment and/or exemplary method of the present invention also relates to a device for detecting the direction of rotation of a piston engine, having at least one cylinder; a piston movable back and forth in the cylinder; cylinder chamber formed inside the cylinder, which is delimited by an inner cylinder wall and the piston; an inlet channel, which opens into the cylinder chamber via at least one inlet valve; an outlet channel, which opens into the cylinder chamber via at least one outlet valve; at least one triggerable throttling device situated in the inlet channel; and a control unit for controlling and/or regulating the piston engine.

Furthermore, the exemplary embodiment and/or exemplary method of the present invention relates to a control unit for controlling and/or regulating a piston engine, having at least one cylinder; a piston movable back and forth in the cylinder; a cylinder chamber formed inside the cylinder, which is delimited by an inner cylinder wall and the piston; an inlet channel, which opens into the cylinder chamber via at least one inlet valve; an outlet channel, which opens into the cylinder chamber via at least one outlet valve; and at least one triggerable throttling device situated in the inlet channel.

The exemplary embodiment and/or exemplary method of the present invention finally also relates to a computer program which is able to run on a computer, in particular on a microprocessor.

Based on a method described herein, the exemplary embodiment and/or exemplary method of the present invention provides that the pressure prevailing in the inlet channel be measured while the piston engine is rotating and compared with a predefinable threshold value, and the direction of rotation of the piston engine then be determined via the result of the comparison. A triggerable throttling device is closed at least for the time of the pressure measurement to isolate the area of the cylinder chamber and the inlet channel from upstream systems such as a turbocharger or a pressure (or vacuum) accumulator, for example.

On this basis appropriate countermeasures may then be taken to prevent damage to the piston engine. Such countermeasures include, for example, stopping the piston engine in the event of a wrong direction of rotation. This may be accomplished, for example, by interrupting the supply of fuel-air mixture or interrupting the ignition.

The operating principle of a piston engine is that a mostly gaseous substance is aspirated into the internal cylinder chamber via an open inlet valve in an intake phase. This is accomplished by the fact that the volume of the internal cylinder chamber is enlarged by an appropriate movement of the piston. The inlet valve is then closed, the substance in the internal cylinder chamber is compressed by a subsequent piston movement in the opposite direction, and then expelled again via an outlet valve. In an internal combustion engine, the mixture is ignited during or after the compression of a fuel-air mixture and then expelled via the outlet valve. In a piston compressor, the gaseous substance aspirated via the inlet valve is expelled during or after the compression via the outlet valve. A partial vacuum may thus be produced in a body connected to the inlet channel or an overpressure may be produced in a body connected to the outlet channel.

The piston engine has an intended direction of rotation due to this mode of operation. If it is attempted to operate the piston engine in the opposite direction, the functions of the inlet and outlet valves are reversed. This would mean that the substance aspirated via the outlet channel and compressed is discharged into the inlet channel via the inlet valve. A pressure that is higher than that in the piston engine operated in the intended direction of rotation will thus prevail in the inlet channel (and thus also in the cylinder chamber) at this point in time. A threshold value may thus be specified for the pressure prevailing in the inlet channel. The pressure in the inlet channel will be less than the threshold value when the piston engine is operated in the intended direction of rotation. However, if the threshold value is exceeded, this would indicate that the piston engine is being operated in the wrong direction of rotation.

According to an exemplary embodiment of the present invention, the threshold value may be determined as a function of a pressure prevailing in the outlet channel. The exemplary method of the present invention follows the observation that in a piston engine operated in the intended direction of rotation, the pressure in the inlet channel is at no time higher than that in the outlet channel. This is, however, possible in the event of a direction of rotation in the opposite direction. Consequently, the instantaneous direction of rotation may be determined using this criterion.

In an exemplary method, in a piston engine such as an internal combustion engine, the threshold value may be determined as a function of an ambient pressure and an exhaust gas counterpressure. The pressure in the outlet channel may thus be approximated by modeling in a simple manner.

The threshold value, which is necessary for determining the direction of rotation, is advantageously described by a predefinable maximum pressure specific to the piston engine. The maximum value may be determined as a function of the engine type prior to determining the direction of rotation and saved in a memory location in a memory of a control unit for the piston engine provided for this purpose. In this way, both the pressure measurement in the outlet channel and the measurement or modeling of the ambient pressure and the exhaust gas counterpressure may be omitted.

As a different approach to achieving the object of the exemplary embodiment and/or exemplary method of the present invention it is proposed, based on the device of the above-mentioned type, that the device include: an arrangement, apparatus or structure for measuring a rotation speed; an arrangement, apparatus or structure for triggering the throttling device; and an arrangement, apparatus or structure for measuring the pressure in the inlet channel when the throttling device is closed; and that the control unit cause the throttling device to close when a rotary motion of the piston engine is detected, measure the pressure in the inlet channel after a predefinable measuring period, compare the measured pressure with a predefinable threshold value, and determine the direction of rotation of the piston engine on the basis of the result of the comparison.

According to an exemplary embodiment of the present invention, it is proposed that the device have an arrangement, apparatus or structure, for example, a pressure sensor, for measuring the pressure in the outlet channel. The pressure prevailing in the outlet channel may be used as a threshold value for the comparison with the pressure prevailing in the inlet channel and thus for the determination of the direction of rotation. The direction of rotation is then determined by comparison of the pressure in the inlet channel with the pressure in the outlet channel.

According to an exemplary embodiment of the present invention, it is proposed that the device have an arrangement, apparatus or structure for modeling the exhaust gas counterpressure and an arrangement, apparatus or structure for measuring the ambient pressure. On the basis of the ambient pressure and the exhaust gas counterpressure, the pressure prevailing in the outlet channel and thus also the threshold value may be determined approximately in a simple manner. The threshold value is then determined from the sum of these two pressures.

The control unit advantageously includes an arrangement, apparatus or structure, for example, an electrical memory element, for storing a maximum pressure specific to the piston engine. The maximum pressure is determined prior to detecting the direction of rotation as a function of the piston engine type, stored in the memory element, and retrieved when needed as a threshold value for determining the direction of rotation. This embodiment therefore requires no arrangement, apparatus or structure for measuring the ambient pressure, the exhaust gas counterpressure, or the pressure in the outlet channel.

The pressure measuring arrangement, apparatus or structure in the inlet channel may include a digital pressure switch which triggers a switching operation when the pressure exceeds or drops below the threshold value. On the basis of the output signal of the pressure switch, it may then be determined whether the piston engine is moving in the right direction of rotation.

As a further approach to achieving the object of the exemplary embodiment and/or exemplary method of the present invention, it is proposed, on the basis of the control unit of the above-mentioned type, that the control unit detect a rotary motion of the piston engine; control the position of the throttling device; and when a rotary motion of the piston engine is detected, cause the throttling device to close, measure the pressure in the inlet channel after a predefinable measuring period, compare this pressure with a predefinable threshold value, and determine the direction of rotation of the piston engine on the basis of the result of the comparison.

Implementation of the exemplary embodiment and/or exemplary method of the present invention in the form of a computer program is of particular significance. The computer program may be run on a computer, on a microprocessor in particular, and is suitable for carrying out or performing the exemplary method according to the present invention. In this case, the exemplary embodiment and/or exemplary method of the present invention is thus implemented by the computer program, so that this computer program represents the exemplary embodiment and/or exemplary method of the present invention in the same way as the method which the computer program is suitable for carrying out. The computer program may be stored on a memory element. A random-access memory, a read-only memory, or a flash memory may be used in particular as a memory element.

DETAILED DESCRIPTION

Figure 1:
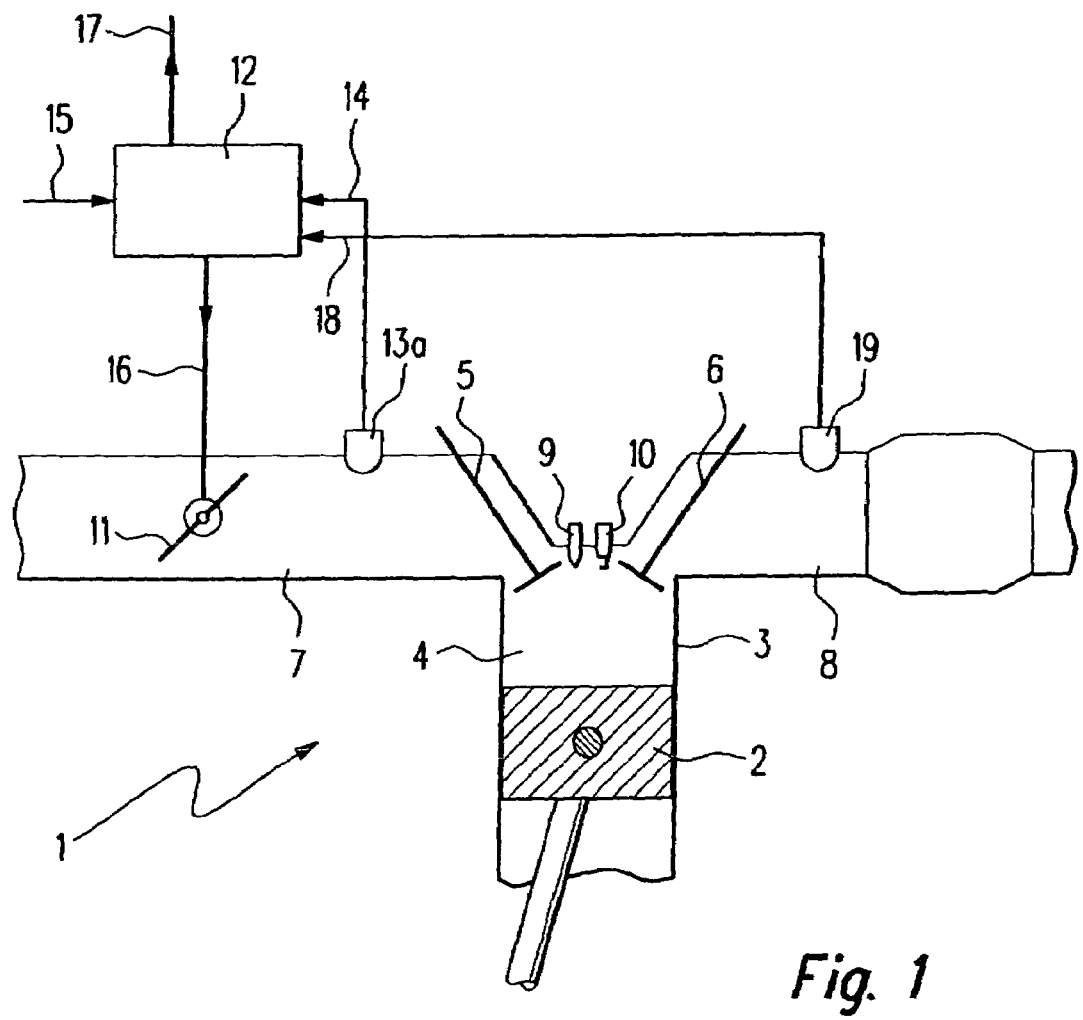
FIG. 1 shows a first exemplary embodiment of a device according to the present invention.

FIG. 1 shows a piston engine as an internal combustion engine 1 having a control unit 12 for determining the direction of rotation of internal combustion engine 1. Internal combustion engine 1 includes a cylinder 3 in whose internal cylinder chamber a piston 2 is movable back and forth. An inlet valve 5, an outlet valve 6, and an injection nozzle 9 for injecting fuel, and a spark plug 10 for igniting the fuel-air mixture are located on the side of cylinder 3 opposite to piston 2. Inside cylinder 3, a cylinder chamber 4, which in the exemplary embodiment of FIG. 1 is a combustion chamber, is delimited by an inner cylinder wall, piston 2, as well as inlet valve 5 and outlet valve 6.

An inlet channel 7 opens into combustion chamber 4 via inlet valve 5. A throttling device 11, which is triggerable by a control unit 12 via a control line 16, is mounted in inlet channel 7. Furthermore, a pressure measuring device 13, which may be a pressure sensor, is located in inlet channel 7. Device 13a supplies the measured pressure values to control unit 12 via a line 14.

An outlet channel 8 opens into combustion chamber 4 via outlet valve 6. A further pressure measuring device 19, which is also a pressure sensor, is situated in outlet channel 8. The values measured by device 19 are relayed to control unit 12 via a line 18.

Control unit 12 includes an arrangement, apparatus or structure for detecting the direction of rotation of engine 1. For this purpose, control unit 12 receives information about the rotational speed of the engine via a further line 15, which is accomplished, for example, by querying a marked transducer disk which is attached to a crankshaft of engine 1 in a rotationally fixed manner and subsequently evaluating the queried values via control unit 12. Finally, control unit 12 supplies the direction of rotation detected to a higher-level control unit (not illustrated) via control line 17. As an alternative or additionally, if a wrong direction of rotation is detected, control unit 12 may also provide the necessary countermeasures, which may be transmitted to engine 1 via line 17. The countermeasures include, for example, shutting down engine 1 by cutting off the fuel supply via injector 9.

If inlet valve 5 is open and outlet valve 8 is closed, a lower pressure prevails in internal cylinder chamber 4 and in inlet channel 7 than in outlet channel 8 as piston 2 moves downward. The partial vacuum aspirates air or a fuel-air mixture into combustion chamber 4 of cylinder 3. The pressures in inlet channel 7 and in outlet channel 8 are measured by pressure measuring devices 13a and 19, and the values determined are supplied to control unit 12. In the example illustrated, the direction of rotation of engine 1 thus corresponds to an intended direction of rotation provided for safe operation of engine 1.

If, however, piston 2 moves upward, i.e., in the wrong direction, the positions of inlet valve 5 and outlet valve 6 being the same, an overpressure prevails in inlet channel 7, i.e., a pressure that is higher than that in outlet channel 8. Consequently, the exhaust gases from the combustion do not escape through outlet valve 6, but through open inlet valve 5 into inlet channel 7 and may damage or even destroy the components situated in inlet channel 7. It is then determined, by comparing in control unit 12 the pressure values determined by pressure measuring devices 13a and 19, that engine 1 is rotating in the wrong direction.

This is accomplished on the basis of the fact that the pressure, which is determined using pressure measuring device 13a, is now higher than the value determined by pressure measuring device 19 in outlet channel 8. It must be noted here, however, that throttling device 11 should be closed for measuring the pressure in inlet channel 7. Only after throttling device 11 is closed by control unit 12 are the pressures prevailing in inlet channel 7 and outlet channel 8 determined after a predefinable measuring period and compared.

If the pressure determined in inlet channel 7 is higher than the pressure determined correspondingly in outlet channel 8, the direction of rotation is opposite to that provided for safe operation. If the pressure determined in inlet channel 7 is lower than or equal to that determined correspondingly in outlet channel 8, the instantaneous direction of rotation corresponds to that provided for safe operation of piston engine 1.

In particular, a maximum value Pmax, which is not exceeded in the event of a direction of rotation provided for safe operation of piston engine 1, may be specified for the pressure prevailing in inlet channel 7 when throttling device 11 is closed, prior to determining the direction of rotation.

In summary, when throttling device 11 is closed and a rotary motion has been detected, the pressure prevailing in inlet channel 7 or in combustion chamber 4 is measured after a predefinable measuring period and compared with a threshold value. If the pressure prevailing in inlet channel 7 or combustion chamber 4 is an underpressure (measured pressure<threshold value), the direction of rotation of engine 1 is correct. However, if an overpressure prevails in inlet channel 7 (measured pressure$\geq$threshold value), this indicates a wrong direction of rotation. The instantaneous pressure prevailing in outlet channel 8, in particular, or a maximum engine type-dependent pressure value Pmax determined prior to detecting the direction of rotation may be used as a threshold value. The pressure prevailing in outlet channel 8 may be approximated by modeling by simply forming the sum of the ambient pressure and the exhaust gas counterpressure.

Figure 2:
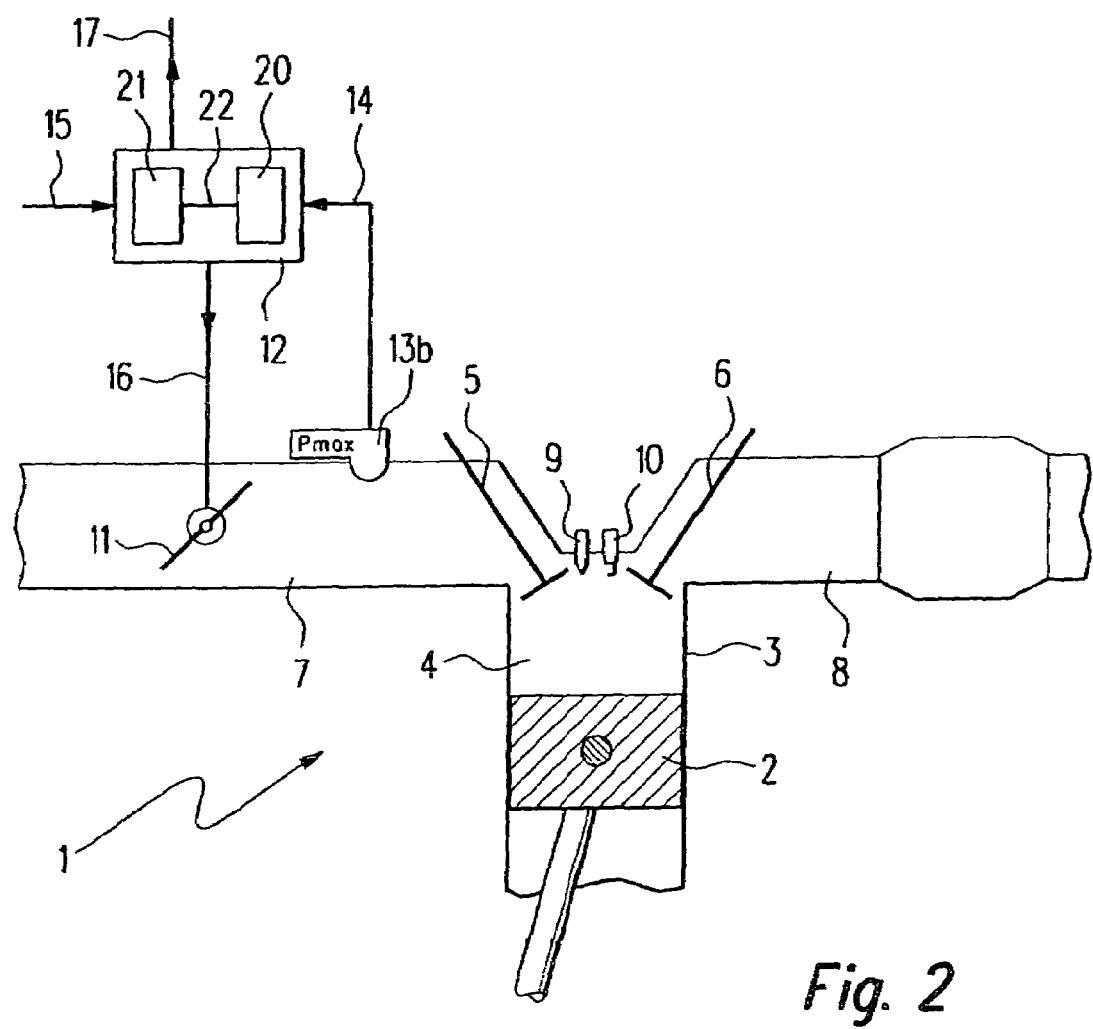
FIG. 2 shows a second exemplary embodiment of a device according to the present invention.

FIG. 2 shows another piston engine as internal combustion engine 1, having a control unit 12 for determining the direction of rotation of engine 1. This embodiment is based on a previously determined maximum value Pmax. Therefore, pressure measuring device 19 in outlet channel 8 is omitted here. In addition, pressure measuring device 13b is a digital pressure switch 13b, which measures the pressure and, above a previously determined engine-specific maximum value Pmax which describes the maximum expected pressure in inlet channel 7 when a rotary motion has been detected and throttling device 11 is closed, relays a signal via line 14 to control unit 12, from which control unit 12 is able to recognize that the direction of rotation of engine 1 is wrong.

Maximum value Pmax is stored in a memory element 20 of control unit 12. Memory element 20 is a random-access memory (RAM), a read-only memory (ROM), or a flash memory, for example. A computer program, used for carrying out the exemplary method according to the present invention when running on a computer 21, in particular a microprocessor, is also stored in memory element 20. The computer program is run after being transmitted from memory element 20 to computer 21 via data line 22 either section by section or instruction by instruction or as a whole. The data line is a bus system, for example. Switch 13b may be an electromagnetic switch, for example, whose opening pressure may be established as a function of the intensity of a current applied to its electromagnet. The intensity of the current applied may be determined as a function of value Pmax stored in memory element 20, and transmitted to switch 13b via line 14.

Figure 3:
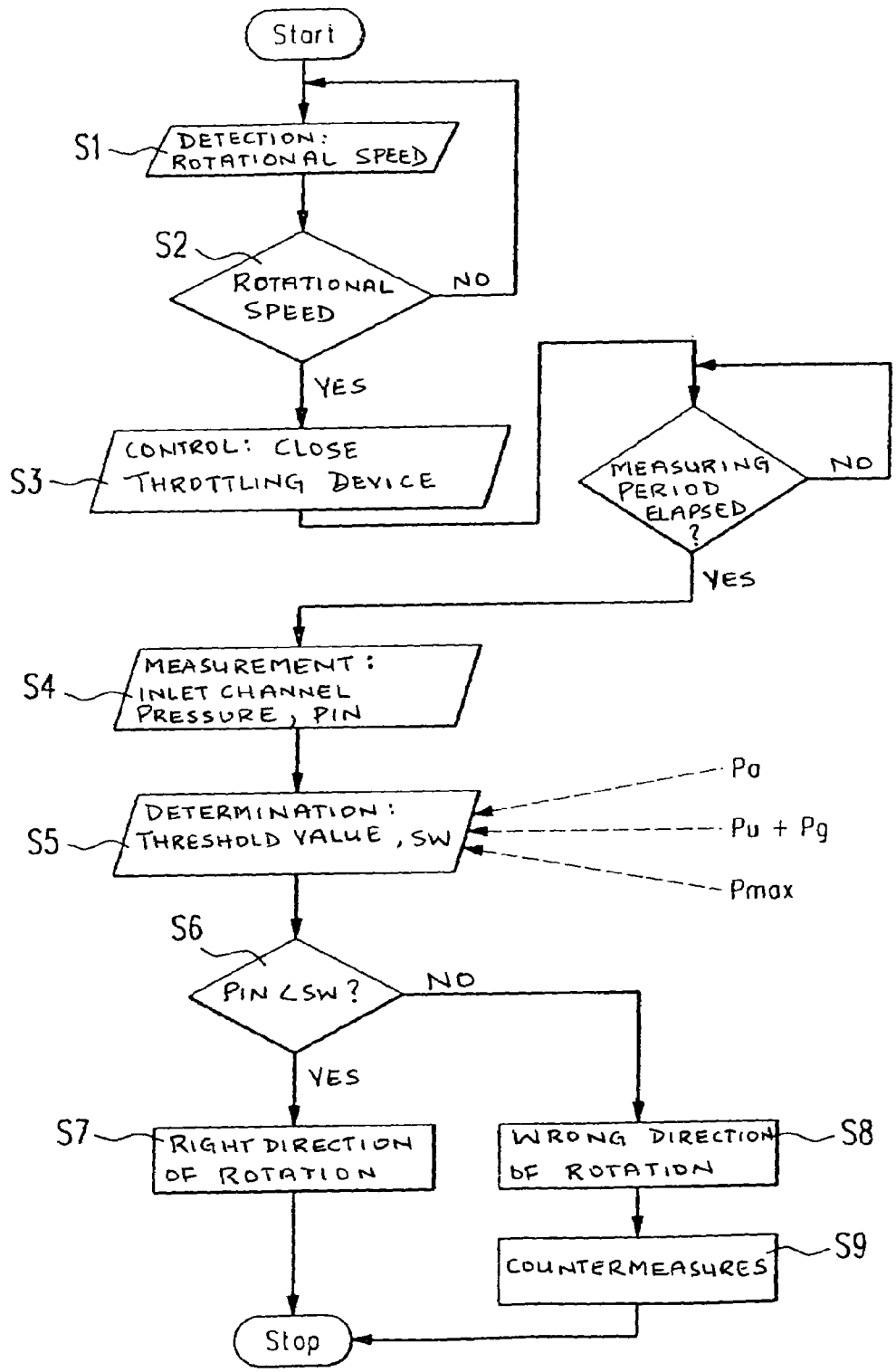
FIG. 3 shows a flow chart of an exemplary method according to the present invention.

FIG. 3 shows a flow chart of the exemplary method of the present invention. This method is advantageously carried out or performed during the first rotary motions upon start of the piston engine from standstill. The rotational speed of the piston engine is measured in a first step S1. A query step S2 checks whether rotational speed>0, i.e., whether the piston engine is rotating. If this is not the case, the procedure jumps back to step S1 and the sequence is repeated from this position. If a rotary motion is detected, a step S3 causes throttling device 11 to close and a subsequent query step checks whether a predefinable measuring period has elapsed. The predefinable measuring period is selected such that it permits a reliably diagnosable pressure to be established in inlet channel 7. In a step S4, pressure sensor 13a or 13b then measures pressure Pin in inlet channel 7 of the piston engine.

Subsequently a threshold value SW is determined in a step S5. It is either already available in memory element 20 of control unit 12 as engine type-dependent maximum value Pmax or is determined, for example, by measuring pressure Pa in outlet channel 8 of the piston engine using a pressure sensor 19 or by forming the sum of a measured ambient pressure Pu with a modeled exhaust gas counterpressure Pg. A query step S6 compares pressure Pin determined in step S4 with threshold value SW determined in step S5. If pressure Pin measured in inlet channel 7 is lower than threshold value SW, a step S7 determines that the direction of rotation of the piston engine is correct, and the method is terminated.

However, if query step S6 determines that the measured pressure Pin is higher than threshold value SW, the procedure branches off to a step S8, in which it is determined that the direction of rotation is wrong. Subsequently the procedure branches off to a step S9, where countermeasures, such as shut-off of the ignition system or blocking of the fuel supply, are initiated, whereupon the method is terminated.

The exemplary method according to the present invention may prevent the piston engine from starting in the wrong direction of rotation. This is particularly important in the case of internal combustion engines which are started without an electric starter or starter-generator, i.e., by themselves by filling one or more cylinders of the engine with fuel and subsequent controlled ignition of the fuel-air mixture. In particular, direct-injection engines may be started in this way.

What is claimed is:

1. A device for detecting the rotation direction of a piston engine, which includes at least one cylinder, a piston movable back and forth in the cylinder, a cylinder chamber formed inside the cylinder which is delimited by an inner cylinder wall and the piston, an inlet channel which opens into the cylinder chamber via at least one inlet valve, an outlet channel which opens into the cylinder chamber via at least one outlet valve, at least one triggerable throttling device situated in the inlet channel, the device comprising:
   a control arrangement to control the piston engine;
   a measuring arrangement to measure a rotational speed;
   a triggering arrangement to trigger the throttling device; and
   a measuring arrangement to measure a pressure in the inlet channel when the inlet valve is open and the throttling device is closed;
   wherein the control arrangement causes the throttling device to close when a rotary motion is detected, measures a pressure in the inlet channel after a predefinable measuring period, compares the measured pressure with a predefinable threshold value to provide a comparison result, and determines the rotation direction of the piston engine based on the comparison result.

2. The device of claim 1, wherein the device includes a pressure measuring arrangement to measure a pressure in the outlet channel.

3. The device of claim 1, wherein the device includes a modeling arrangement to model an exhaust gas counterpressure and an ambient pressure measuring arrangement to measure an ambient pressure.

4. The device of claim 1, wherein the control arrangement includes a memory arrangement to store a maximum pressure specific to the piston engine.

5. The device of claim 1, wherein a pressure measuring arrangement in the inlet channel includes a digital pressure switch which triggers a switching operation when the pressure exceeds or drops below the threshold value.

6. A control system for controlling a piston engine, which includes at least one cylinder, a piston movable back and forth in the cylinder, a cylinder chamber formed inside the cylinder which is delimited by an inner cylinder wall and the piston, an inlet channel which opens into the cylinder chamber via at least one inlet valve, an outlet channel which opens into the cylinder chamber via at least one outlet valve, at least one triggerable throttling device situated in the inlet channel, the control arrangement comprising:
   a detecting arrangement to detect a rotary motion of the piston engine;
   a control arrangement to control a position of the throttling device, and to close, when a rotary motion of the piston engine is detected, the throttling device, to measure a pressure in the inlet channel after a predefinable measuring period, to compare the pressure with a predefinable threshold value and provide a comparison result, and to determine a rotation direction of the piston engine based on the comparison result.

7. A computer program executable on a processor arrangement, comprising:
   computer program code for detecting a rotation direction of a piston engine, which includes at least one cylinder, a piston movable back and forth in the cylinder, a cylinder chamber formed inside the cylinder which is delimited by an inner cylinder wall and the piston, an inlet channel which opens into the cylinder chamber via at least one inlet valve, an outlet channel which opens into the cylinder chamber via at least one outlet valve, and t least one triggerable throttling device situated in the inlet channel, by performing the following:
   measuring a pressure prevailing in the inlet channel when the inlet valve is open;
   comparing the measured pressure with a predefinable threshold value to provide a comparison result; and
   determining the rotation direction of the piston engine based on the comparison result;
   wherein the throttling device is closed at least for a time that the pressure is measured.

8. A computer memory medium having a computer program executable on a processor arrangement, comprising:
   computer program code for detecting a rotation direction of a piston engine, which includes at least one cylinder, a piston movable back and forth in the cylinder, a cylinder chamber formed inside the cylinder which is delimited by an inner cylinder wall and the piston, an inlet channel which opens into the cylinder chamber via at least one inlet valve, an outlet channel which opens into the cylinder chamber via at least one outlet valve, and t least one triggerable throttling device situated in the inlet channel, by performing the following:

measuring a pressure prevailing in the inlet channel when the inlet valve is open;

comparing the measured pressure with a predefinable threshold value to provide a comparison result; and determining the rotation direction of the piston engine based on the comparison result;

wherein the throttling device is closed at least for a time that the pressure is measured.

9. The computer memory medium of claim 8, wherein the memory medium includes one of a random-access memory, a read-only memory, and a flash memory.

10. A method for detecting a rotation direction of a piston engine, which includes at least one cylinder, a piston movable back and forth in the cylinder, a cylinder chamber formed inside the cylinder which is delimited by an inner cylinder wall and the piston, an inlet channel which opens into the cylinder chamber via at least one inlet valve, an outlet channel which opens into the cylinder chamber via at least one outlet valve, and t least one triggerable throttling device situated in the inlet channel, the method comprising:

measuring a pressure prevailing in the inlet channel when the inlet valve is open;

comparing the measured pressure with a predefinable threshold value to provide a comparison result; and determining the rotation direction of the piston engine based on the comparison result;

wherein the throttling device is closed at least for a time that the pressure is measured.

11. The method of claim 10, wherein the threshold value is determined as a function of a pressure prevailing in the outlet channel.

12. The method of claim 10, wherein the piston engine is an internal combustion engine, and wherein the threshold value is determined as a function of an ambient pressure and an exhaust gas counterpressure.

13. The method of claim 10, wherein the threshold value is described by a predefinable maximum pressure specific to the piston engine.

* * * * *

UNITED STATES PATENT AND TRADEMARK OFFICE
CERTIFICATE OF CORRECTION

PATENT NO. : 6,975,935 B2
APPLICATION NO. : 10/512595
DATED : December 13, 2005
INVENTOR(S) : Rolf Kohler et al.

It is certified that error appears in the above-identified patent and that said Letters Patent is hereby corrected as shown below:

Column 2, line 1, change "direction bf rotation" to --directon of rotation--

Column 2, line 15, change "cylinder chember" to --cylinder chamber--

Column 8, line 48, change "and t least one" to --and at least one--

Column 9, line 1, change "and t least one" to --and at least one--

Column 9, line 21, change "and t least one" to --and at least one--

Signed and Sealed this

Nineteenth Day of September, 2006

JON W. DUDAS
*Director of the United States Patent and Trademark Office*